United States Patent Office 3,023,117
Patented Feb. 27, 1962

3,023,117
ACTIVE ACIDS FOR METAL DRIERS USEFUL IN SICCATIVE COATINGS
Oliver J. Grummitt and James A. Stearns, Cleveland, Ohio, assignors to The Sherwin-Williams Company, Cleveland, Ohio, a corporation of Ohio
No Drawing. Filed Oct. 3, 1957, Ser. No. 687,869
11 Claims. (Cl. 106—264)

This invention relates in its broadest aspects to an improvement in metal organic siccatives or driers useful in drying oils and drying oil fatty acid esters as commonly used in protective and decorative coatings to accelerate the drying rate.

Up to the present time it has been generally accepted that paint driers contained as the active component an ionizable metal cation, illustratively, cobalt, manganese and lead, as most useful members of the group, in chemical combination with an organic acid radical of sufficient size to promote oil solubility and stability of the resultant metalorganic compound. Except for the qualities of color, solubility and stability, the anionic organic portion of the molecule has not heretofore had an observable influence upon the catalytic activity of the siccative compound. At equivalent levels of the metal cations, cobalt, managanese and lead, no consistent measurable differences in drying rates of coatings containing various driers has been reported when the drying metal cations are in combination with various known acidic anions.

This invention discloses for the first time that the drying rate of the metal organic driers of the prior art may be given enhanced catalytic activity in siccative coating compositions and provides a new group of acids which, when combined with the known catalytically active metals of the prior art, provide the necessary oil solubility and stability of prior art organic acids plus additional catalytic activity of their own.

The new organic acids which are the subject of this invention contain as the essential and critical grouping in the organic portion of the molecule the azomethine group:

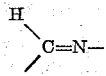

These acids may be generically and structurally represented as follows:

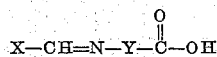

where X and Y are selected from the group consisting of alkyl, cycloalkyl, aryl, alkaryl and alkoxyaryl groups containing from 6–14 carbon atoms in a hydrocarbon structure. A typical acid of this general structure is N-benzal-p-aminophenylacetic acid or (1)
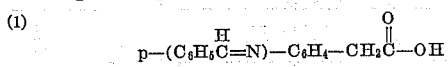

Another representative acid is N-(p-isopropylbenzal)-p-amino phenylacetic acid or (2)
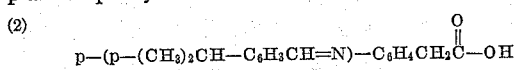

Still another species of the new class of drier acids is N-(p-octyl-oxybenzal)-p-aminophenyl acetic acid or (3)
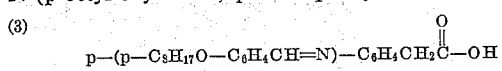

Theoretically, acids of this type may be made by heating a selected alkyl, cycloalkyl, aryl or alkaryl aldehyde with an appropriate amino alkyl, cycloalkyl, aryl or alkaryl acetate in the manner of producing Schiff bases. In actual practice this method has not always proved practicable, and variation as hereinafter shown is of value.

To illustrate, in attempting to produce N-benzal-p-aminophenylacetic acid by heating benzaldehyde with p-aminophenylacetic acid the product obtained was identified as unchanged p-aminophenylacetic acid having a melting point of 199–200° C.

A preferred method of preparation is to first neutralize carefully the p-aminophenylacetic acid with a fixed alkali. An alcoholic solution of the sodium salt in 95% ethyl alcohol is heated to boiling and to this, in dropwise addition one adds an equivalent amount of freshly distilled benzaldehyde. The alcoholic solution is refluxed for some time (on the order of 30 minutes). The product recovered on cooling is re-crystallized from absolute alcohol after treating the alcoholic solution with an activated carbon and filtering off the decolorizer. The pale yellow recovered crystals had a M.P. of 161–163°.

In preparation of the metal drier salts of the azomethine group containing acids, a solution of slightly less than 10% of the drier metal salts (nitrate, etc.) is added to a dilute aqueous solution of the sodium salt of the aldehyde-amine acid condensate. The metal drier salts are precipitated out of solution, water-washed and recovered.

Two different drying oil fatty acid containing coatings of siccative nature were prepared and used for testing purposes. One was a drying oil modified alkyd resin prepared from linseed oil and pentaerythritol further esterified with a maleic-rosin adduct of about 30 gallons oil length (e.g. 30 gallons of drying oil per 100# of resin). This material was employed as a clear varnish herein identified as "alkyd varnish." The second siccative coating used for test was a pigmented white gloss enamel made from a soya bean oil modified pentaerythritol alkyd varnish and is herein identified as the "white gloss enamel."

The drying tests hereinafter reported were run at room temperature as a practical means of evaluation. Films were drawn down on glass panels at a 0.003 inch film thickness.

In order to make clear the reduction to practice of this invention the following examples set out in detail the practice of the invention using cobalt as the illustrative drier metal. It is well understood in the art relating to siccatives for coating compositions that manganese, lead, zinc, iron, zirconium, calcium and other metals including cerium are known to have drier activity, and though they vary somewhat in their exact catalytic function as driers, are useful as a group and as individuals as catalysts to promote drying of drying oil fatty acid containing coatings and other unsaturated coatings which dry by oxidation and polymerization.

The term "drier metals" is herein used to refer generically to useful cations. The cobalt metal ion has been adopted to illustrate production of the metalorganic driers of the invention, the others produced in analogous fashion.

All parts referred to in the following examples are parts by weight unless otherwise specifically noted in the examples.

EXAMPLE I 21 parts of p-aminophenylacetic acid (Eastman)
4 parts NaOH
250 parts water were heated to 80–90° to form a solution. The solution was further titrated to a phenolpthalein end point with 1 N sodium hydroxide. 23 parts of product was recovered by evaporating off the water by heating on a steam bath. To 20.8 parts (0.12 mole) of the recovered sodium salt in 180 parts 95% ethyl alcohol were added in small increments 12.7 parts (0.12 mole) of freshly distilled benzaldehyde. The reaction mixture was refluxed 30 minutes. 26 parts of a brown product were recovered upon cooling. After treatment of the brown product with activated carbon and re-crystallization from absolute ethyl alcohol 16 parts of a product having an M.P. of 161–163° C. was recovered. The product was identified as $$C_{15}H_{12}O_2NNa$$

which has a theoretical N percent of 5.36 and an actual N percent of 5.44.

2.00 parts of the sodium N-benzal-p-aminophenylacetate were dissolved in 20 parts water and to this was added, in small increments, a solution of 1.30 parts cobaltous nitrate hexahydrate dissolved in 15 parts water. The precipitate was recovered, purified and dried over calcium chloride in a vacuum dessicator. Calculating on the basis of the material being cobaltous N-benzal-p-aminophenyl acetate the cobalt content would be 11.0% theoretical. 10.2% cobalt was found by analysis using alpha-nitroso-beta-naphthol and ignition to $CO_3O_4$.

EXAMPLE II

To a boiling solution of 26 parts of sodium p-aminophenylacetate in 200 parts of 95% ethyl alcohol were added in increments 22.2 parts of freshly distilled p-isopropylbenzaldehyde (Eastman). The alcoholic solution of reactants was refluxed 30 minutes after the last addition and cooled. After standing overnight, 14 parts of a brownish crystalline material was recovered directly as crystals and an additional 11 parts were recovered by further evaporation of and crystallization from the mother liquor. The total parts of crystals so recovered were solubilized in absolute alcohol, filtered through activated carbon and 19 parts of pale yellow crystals having an M.P. of 274–276° C. were recovered. This material was identified as sodium N-(p-isopropylbenzal)-p-aminophenylacetate.

2 parts of the recovered product were dissolved in 20 parts of water to which were added with stirring 0.906 part of cobaltous acetate tetrahydrate in aqueous solution under an inert gas (nitrogen) atmosphere. The pink precipitate recovered was water washed, dried and recovered, first as a blue which changed to a brown product. 1.65 parts of the cobalt salt was recovered having an actual cobalt content (determined) of 9.2% compared with a theoretical 9.5%. The material was identified as cobaltous N-(p-isopropylbenzal)-p-aminophenylacetate.

Following a similar procedure, the other drier metals were similarly converted to the corresponding metal organic compound as described for cobalt.

EXAMPLE III p-Octyloxybenzaldehyde was prepared based on C. Weygand and R. Gabler, J. prakt. Chem., 155, 332 (1940), in accordance with the following: 16 parts KOH in 200 parts cyclohexanol were weighed into a glass reaction vessel equipped with reflux condenser, agitator and thermometer and heated to 100° C. in an oil bath. 24.4 parts p-hydroxybenzaldehyde were dissolved in the hot solution after which 57.6 parts of 1-iodo-octane were added and heating and agitation continued at 120–130° for an additional four hours. The reaction mixture was cooled to room temperature, dissolved in 200 parts ether, washed with water several times followed by washes with 5% HCl and 5% $Na_2CO_3$ solutions, again with water and the recovered material dried over anhydrous calcium sulfate. After distilling off the ether, the pressure was reduced to 0.1 mm. and at a temperature of 100° C. the cyclohexanol was removed. The recovered orange liquid was redistilled at a pressure of 1.0 mm. and a temperature of 134–135°/0.5 mm. to yield 27 parts of a pale yellow liquid.

12.1 parts of sodium p-aminophenylacetate in solution in 80 parts of 95% ethyl alcohol was heated to boiling and to this in increments was added 17.4 parts of the recovered p-octyloxybenzaldehyde (of above) in small increments of addition. Refluxing was continued after the last addition for 20 minutes and the crude solids which came down were recovered. The crude product was dissolved in absolute alcohol, decolorized, and recrystallized from an absolute alcohol solution to yield pale yellow crystals M.P. of 240–242° C.

The recovered sodium salt was converted to the cobaltous N-(p-octyloxybenzal)-p-aminophenylacetate by double decomposition reaction with cobaltous sulfate heptahydrate from an aqueous solution under nitrogen gas similar to the previously set out preparations. A greenish soapy solid was recovered after washing and purification. Theoretical cobalt 7.40%, found 7% for a compound corresponding to $C_{46}H_{54}O_6N_2Co$. The product was identified as cobaltous N-(p-octyloxybenzal)-p-aminophenylacetate. Manganese and lead salts were prepared in a similar fashion from the sodium salt.

The cobalt metal salts of the acids previously prepared were used in representative siccative coating compositions as described herein in comparison with cobalt octoate in conjunction with other metal driers (here as the octoate salts) as is the general procedure in the art. The percentages shown in the following tables are percent by weight of the metal described based upon the non-volatile portion of the drying oil fatty acid ester type vehicles selected for test and demonstration.

The dry-to-touch time is the time in minutes required for a test draw down film to dry to the degree of solidification essential so that a light touch with the forefinger removes none of the film.

Drying tests were conducted after 24 hours aging and again after 60 days aging in order to test the stability upon age in the package of the new drier salts. Stability is, of course, essential to commercial importance and value of paint driers.

The drying tests at 24 hours are directly comparable, as are the tests after 60 days. However, due to differences in temperature and humidity at the times the two series of tests were run, direct comparisons of individual mixtures between the two series should not be made. Groups of tests in each series are comparable.

*Table I*

EFFECT OF COBALTOUS N-BENZAL-P-AMINOPHENYL-ACETATE ON THE DRYING OF AN ALKYD VARNISH

| Exp. | Lead, percent | Manganese, percent | Cobalt | | Dry-to-touch time, min. | |
|---|---|---|---|---|---|---|
| | | | As N-benzal-p-aminophenylacetate, percent | As octoate, percent | 24 hrs. aging | 60 days' aging |
| 1 | 0.5 | 0.03 | | 0.05 | 125 | 195 |
| 2 | 0.5 | 0.03 | 0.05 | | 120 | 190 |
| 3 | 0.5 | | | 0.05 | 135 | 205 |
| 4 | 0.5 | | 0.05 | | 130 | 195 |
| 5 | | 0.03 | | 0.05 | 245 | 340 |
| 6 | | 0.03 | 0.05 | | 240 | 330 |
| 7 | | | | 0.05 | 190 | 210 |
| 8 | | | 0.05 | | 195 | 210 |

*Table II*

EFFECT OF COBALTOUS N-BENZAL-P-AMINOPHENYL-ACETATE ON THE DRYING OF A WHITE GLOSS ENAMEL

| Exp. | calcium, percent | Cobalt | | Dry-to-touch time, min. | |
|---|---|---|---|---|---|
| | | As octoate, percent | As N-benzal-p-aminophenylacetate, percent | 24 hrs. aging | 60 days' aging |
| 1 | 0.236 | 0.018 | | 160 | 185 |
| 2 | 0.236 | | 0.018 | 145 | 165 |
| 3 | 0.236 | 0.0045 | | 290 | 270 |
| 4 | 0.236 | | 0.0045 | 270 | 255 |

Table III
EFFECT OF COBALTOUS N-(P-ISOPROPYLBENZAL)-P-AMINO-PHENYLACETATE ON THE DRYING OF AN ALKYD VARNISH

| Exp. | Lead, percent | Manganese, percent | Cobalt | | Dry-to-touch time, min. | |
|---|---|---|---|---|---|---|
| | | | As octoate, percent | As N-(p-isopropylbenzal)-p-aminophenylacetate, percent | 24 hrs. aging | 60 days aging |
| 1 | 0.5 | 0.03 | 0.05 | | 95 | 160 |
| 2 | 0.5 | 0.03 | | 0.05 | 90 | 150 |
| 3 | 0.5 | | 0.05 | | 100 | 185 |
| 4 | 0.5 | | | 0.05 | 95 | 180 |
| 5 | | 0.03 | 0.05 | | 200 | 270 |
| 6 | | 0.03 | | 0.05 | 195 | 265 |
| 7 | | | 0.05 | | 170 | 220 |
| 8 | | | | 0.05 | 150 | 190 |

Table IV
EFFECT OF COBALTOUS N-(P-ISOPROPYLBENZAL)-P-AMINOPHENYLACETATE ON THE DRYING OF A WHITE GLOSS ENAMEL

| Exp. | Calcium, percent | Cobalt | | Dry-to-touch time, min. | |
|---|---|---|---|---|---|
| | | As octoate, percent | As N-(p-isopropylbenzal)-p-aminophenyl acetate, percent | 24 hrs. aging | 60 days' aging |
| 1 | 0.236 | 0.018 | | 160 | 185 |
| 2 | 0.236 | | 0.018 | 140 | 160 |
| 3 | 0.236 | 0.0045 | | 290 | 270 |
| 4 | 0.236 | | 0.0045 | 265 | 255 |

Table V
EFFECT OF COBALTOUS N-(P-OCTYLOXYBENZAL)-P-AMINOPHENYL-ACETATE ON THE DRYING OF AN ALKYD VARNISH

| Exp. | Lead, percent | Manganese, percent | Cobalt | | Dry-to-touch time, min. | |
|---|---|---|---|---|---|---|
| | | | As octoate, percent | As N-(p-octyloxybenzal)-p-aminophenylacetate, percent | 24 hrs. aging | 60 days' aging |
| 1 | 0.5 | 0.03 | 0.05 | | 120 | 150 |
| 2 | 0.5 | 0.03 | | 0.05 | 105 | 130 |
| 3 | 0.5 | | 0.05 | | 130 | 170 |
| 4 | 0.5 | | | 0.05 | 120 | 155 |
| 5 | | 0.03 | 0.05 | | 260 | 320 |
| 6 | | 0.03 | | 0.05 | 260 | 320 |
| 7 | | | 0.05 | | 220 | 240 |
| 8 | | | | 0.05 | 205 | 240 |

Table VI
EFFECT OF COBALTOUS N-(P-OCTYLOXYBENZAL)-P-AMINOPHENYL-ACETATE ON THE DRYING OF A WHITE GLOSS ENAMEL

| Exp. | Calcium, percent | Cobalt | | Dry-to-touch time, min. | |
|---|---|---|---|---|---|
| | | As octoate, percent | As N-(p-octyloxybenzal)-p-aminophenylacetate, percent | 24 hrs. aging | 60 days' aging |
| 1 | 0.236 | 0.018 | | 210 | 230 |
| 2 | 0.236 | | 0.018 | 190 | 205 |
| 3 | 0.236 | 0.0045 | | 400 | 440 |
| 4 | 0.236 | | 0.0045 | 380 | 410 |

In the above tables consistent advantage is to be observed when the acid radical of the metalorganic drier contains the azomethine group. While in some instances the time advantage is relatively small, it is consistent, and thus opens up a new line of approach to drier catalyst improvement not heretofore known.

Having thus described our invention and illustrated both its reduction to practice and usefulness in representative examples, what we claim is:

1. A composition of matter useful as a siccative in conjunction with drying oil fatty acids groups which comprises azomethine compounds having the following general structure:

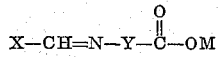

where X and Y are selected from the group consisting of alkyl, cycloalkyl, aryl, alkaryl and alkoxyaryl groups containing from 6–14 carbon atoms in a hydrocarbon structure and M is a metal selected from the group consisting of lead, cobalt, manganese, zinc, calcium, cerium, zirconium and iron.

2. The composition of claim 1 where the metal ion is cobalt.
3. The composition of claim 1 where the metal ion is lead.
4. The composition of claim 1 where the metal ion is manganese.
5. The cobalt salt of N-benzal p-aminophenylacetic acid.
6. The cobalt salt of N-(p-octyloxybenzal)-p-aminophenylacetic acid.
7. The cobalt salt of N-benzal p-aminophenylacetic acid.
8. The cobalt salt of N-(p-octyloxybenzal)p-aminophenylacetic acid.
9. The drier metal salts of N-(p-isopropylbenzal)p-aminophenylacetic acid.
10. The cobalt salt of N-(p-isopropylbenzal)p-aminophenylacetic acid.
11. A composition of matter which comprises a drying oil fatty acid ester and a salt of an organic acid containing an azomethine group having the general structure:

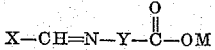

where X and Y are selected from the group consisting of alkyl, cycloalkyl, aryl, alkaryl and alkoxyaryl groups containing from 6–14 carbon atoms in a hydrocarbon structure and M is a metal selected from the group consisting of lead, cobalt, manganese, zinc, calcium, cerium, zirconium and iron.

References Cited in the file of this patent
UNITED STATES PATENTS

| 2,063,838 | Bruson et al. | Dec. 8, 1936 |
| 2,631,944 | Coffey et al. | Mar. 17, 1953 |
| 2,852,405 | Myers et al. | Sept. 16, 1958 |
| 2,861,996 | Brathge et al. | Nov. 25, 1958 |

FOREIGN PATENTS

| 947,726 | Germany | Aug. 26, 1956 |

UNITED STATES PATENT OFFICE
CERTIFICATION OF CORRECTION

Patent No. 3,023,117                            February 27, 1962

Oliver J. Grummitt et al.

It is hereby certified that error appears in the above numbered patent requiring correction and that the said Letters Patent should read as corrected below.

Column 1, lines 61 to 63, formula (2) should appear as shown below instead of as in the patent:

column 6, line 37, beginning with "7. The cobalt salt" strike out all to and including "phenylacetic acid." in line 40, same column 6; same column 6, lines 41, 43 and 45, for the claims numbered "9, 10 and 11" read -- 7, 8 and 9 --; in the heading to the printed specification, line 8, for "11 Claims" read -- 9 Claims --.

Signed and sealed this 11th day of September 1962.

(SEAL)
Attest:

ERNEST W. SWIDER                                     DAVID L. LADD

Attesting Officer                                     Commissioner of Patents